June 24, 1930.   R. F. BENNETT   1,766,323
METHOD OF AND APPARATUS FOR LEVELING WORK
Filed April 26, 1928   3 Sheets-Sheet 1
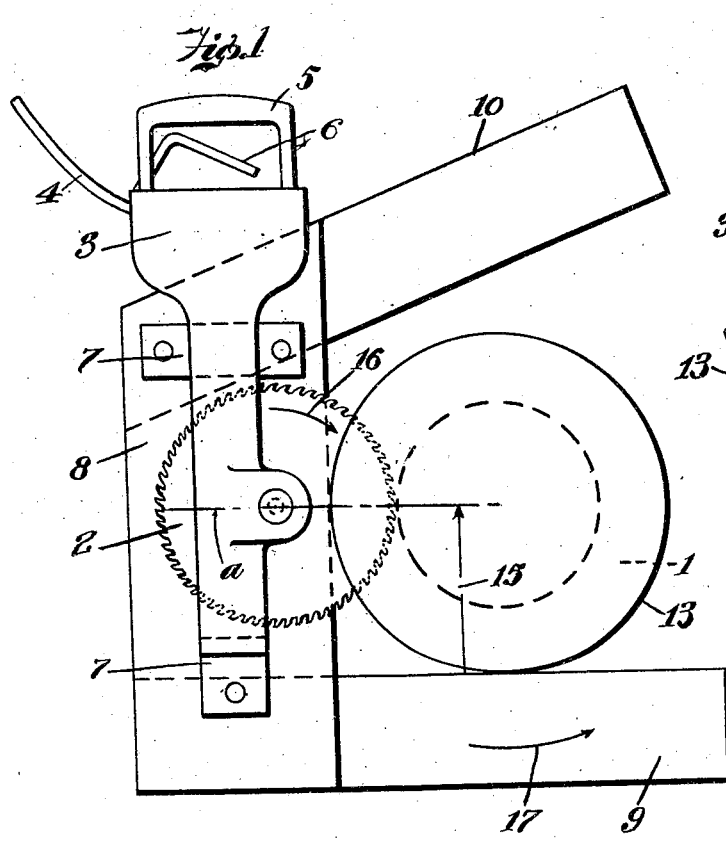
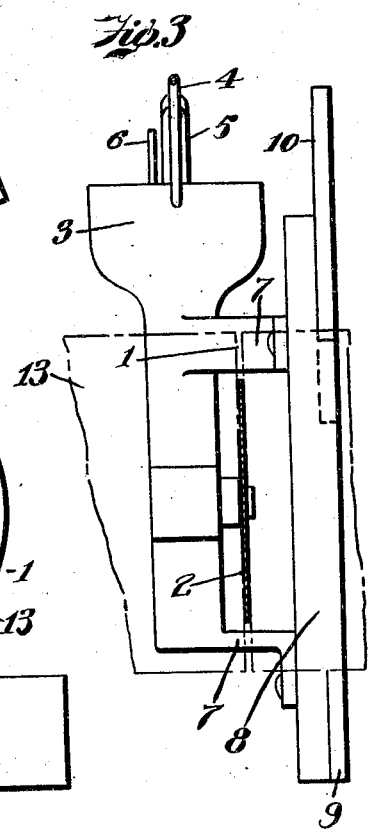
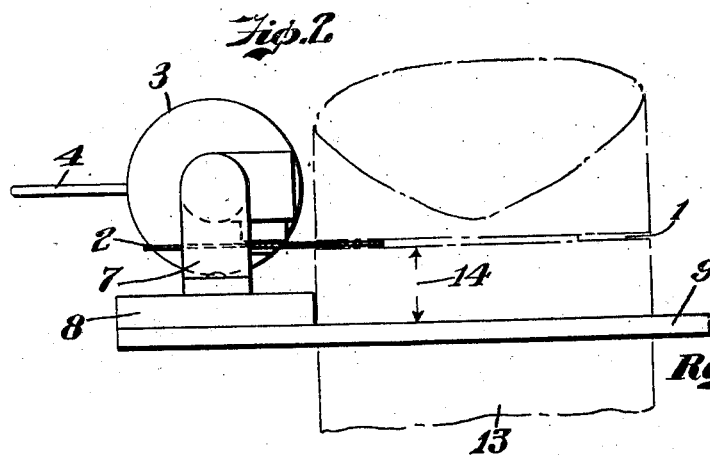
Inventor
Raymond F. Bennett
By Attorney June 24, 1930. R. F. BENNETT 1,766,323
METHOD OF AND APPARATUS FOR LEVELING WORK
Filed April 26, 1928 3 Sheets-Sheet 2
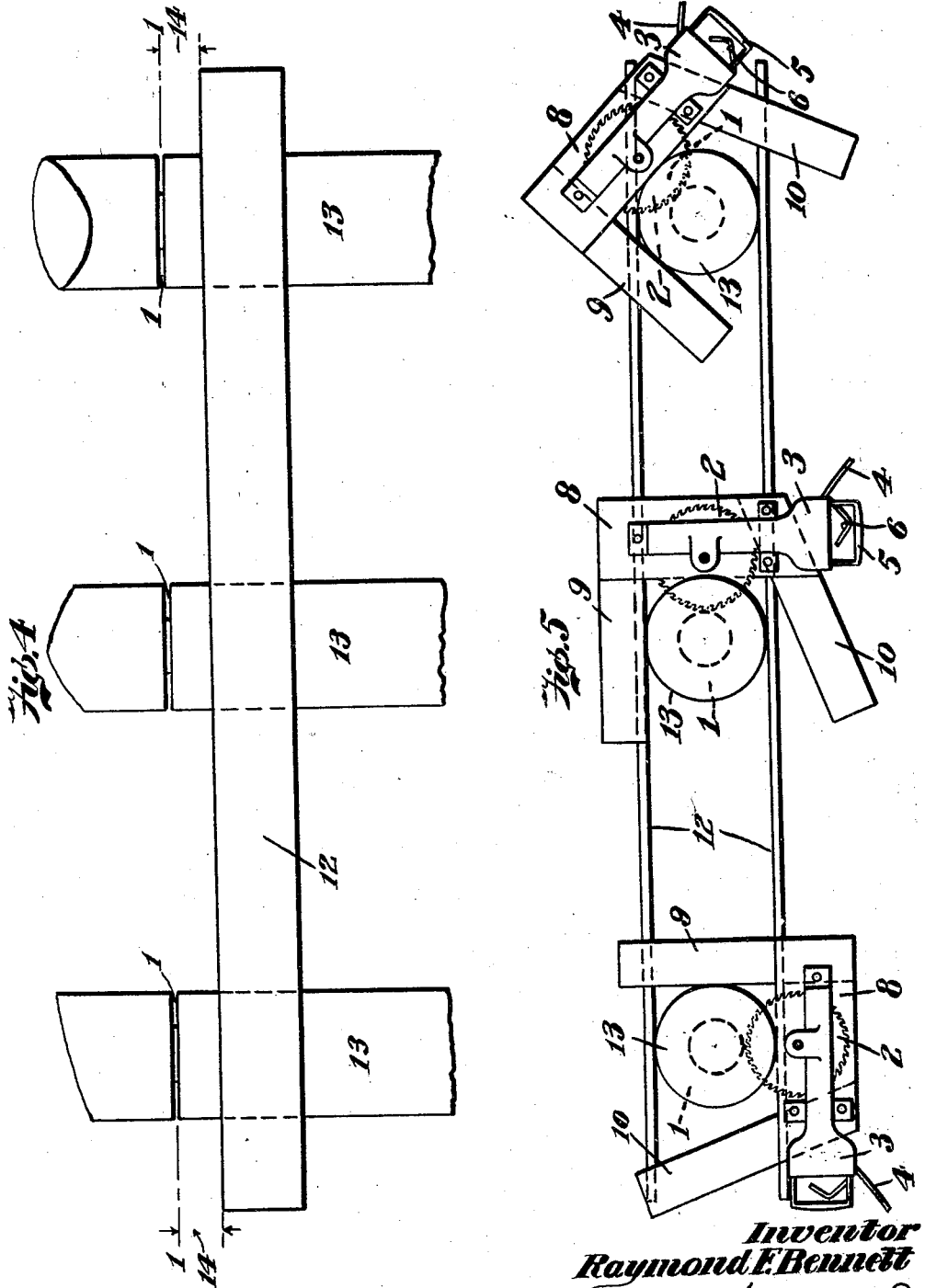
Inventor
Raymond F. Bennett
By Ellis Spackman
Attorney

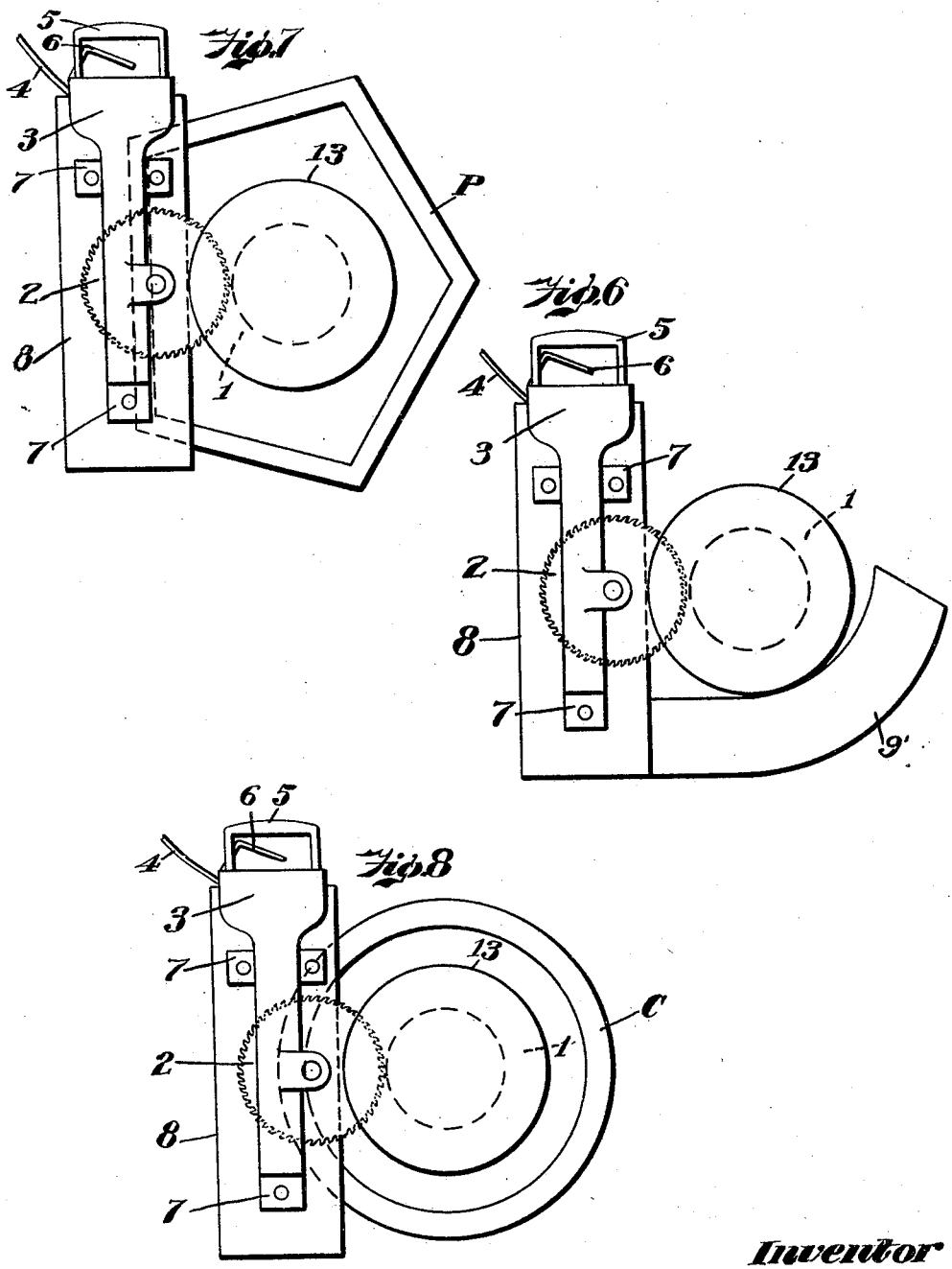

Patented June 24, 1930

1,766,323

UNITED STATES PATENT OFFICE

RAYMOND F. BENNETT, OF PORTLAND, MAINE

METHOD OF AND APPARATUS FOR LEVELING WORK

Application filed April 26, 1928. Serial No. 272,885.

In topping by saw cut there has been much difficulty in securing a true or horizontal plane in the kerf. This is well illustrated in the problem of sawing piles or posts to level.

It has been customary in small or scattered jobs to mark the piles for cutting off by straight-edges tacked on each side and at the required height and marking around the piles by means of a supplementary straight-edge laid on the strips or straight-edges so positioned. This method has always been expensive and tedious. On large jobs rigs have been made to do this work satisfactorily and economically by power, but these machines are heavy and expensive and not sufficiently portable to be economical in use on scattered or small jobs.

My present invention obviates all these difficulties so that I am able even with standard hand-guided power saws to cut to common level and to individual plane.

As indicated in the drawings the usual available power saw is a circular saw run by compressed air, electricity or other power and not too heavy or to powerful for men to handle without danger to themselves, even while on somewhat insecure staging.

The saw blade is usually of about 12 inches diameter and adapted to cut to a depth of about 4 inches so that I contemplate a kerf around the pile to that depth. Thus a pile over 8 inches in diameter would not be entirely cut off and the heart or core would be left to be cut off by hand using the ordinary hand saws, but the kerf made by the power saw serves as an efficient guide in thus finishing the cut. An 8 inch pile would be entirely cut off by my rig while a 12 inch pile would be 90% cut off and a 16 inch pile would be 75% cut off. In each case the kerf is ample to guide the hand saw and when it is considered that one of my rigs does the work of six or seven men, it will be seen that there is a large saving and much better work is produced.

In the accompanying drawings like reference characters are used to designate corresponding parts. In the drawings:

Fig. 1 is a front elevation of a saw apparatus in accordance with my invention.

Fig. 2 is a view from the bottom of Fig. 1.

Fig. 3 is a side view of Fig. 1 from the right, the outlines of the pile being shown in dotted lines.

Fig. 4 indicates in elevation a row of piles or posts to be cut off to grade.

Fig. 5 is a plan of the same indicating the saw rig in various successive positions while making the cut around the pile, and Figs. 6, 7 and 8 show modifications of the construction illustrated in Figs. 1, 2, and 3.

Referring to Figs. 1, 2 and 3 of the drawings, I have indicated at 2 the circular saw connected to a drive such as a motor 3. The connection 4 may be an air hose, electric cable, flexible shaft or other power transmitting means. I have shown at 5 an operating handle of usual design with a trigger 6 operating a valve or switch to control the power. Such a saw represents an ordinary power operated portable saw now on the market.

To any such saw I may attach by suitable lugs 7 a cheek plate 8 carrying a plurality of divergent arms 9 and 10. The arm 9 is disposed parallel to the depth axis $a$ of the saw cut and acts as a stop to prevent the rotative tendency of the saw to run it out of the cut.

The attachment of the power saw to a cheek plate is preferably made so that the saw may be easily and quickly attached or detached so that it may be at all times available for ordinary work or used for this special work.

The lower faces of the plates or arms 8, 9, and 10 are in one plane and parallel to the plane of the saw 2 so that the saw kerf at 1 will be a predetermined distance (14) from the straight edge 12, the angle of attachment of the arm 10, to the cheek 8 may be varied so that piles of varying diameter may be admitted within the confines of the members 8, 9 and 10, it being desirable that the member 9 at all times contact the pile or other material to be sawed so that the depth axis of the saw cut may be constant.

In operation on a pile set as 13, 13, 13 to be cut off to a grade 1, 1, straight edges 12, 12 are tacked on the sides of the piles at a distance indicated by the opposed arrows 14 below grade equal to the distance between the plane of the saw and the plane of the face of the cheek plate 8 and the arms 9 and 10. These straight-edges are placed a distance below the desired kerf grade equal to the indicated spacing 14 which is that of the saw distance from the face of the plates or arms 9 and 10.

It is evident that the piles need not necessarily be vertical nor the straight-edges be horizontal, but the guiding edges of the straight-edges should be in one plane. When the power saw with my attachment is applied to the straight-edges 12, 12, the face of the cheek plates are downward and resting on the straight-edges. The saw is then started and brought into contact with the pile so as to cut to full depth, say to the dotted circle (Figs. 1 and 5). The saw is passed around the pile keeping the saw full depth into the pile and keeping the face of the cheek plate 8 and arms 9 and 10 in bearing on the straight-edges 12, 12. A true cut or kerf is thus made into the pile to the full depth of the saw all the way around. As above stated, if the pile is not entirely cut off the central portion or heart or core represented within the dotted circle is sawed off by ordinary hand methods using the kerf to guide the hand saw.

The distance 15 between the center of the saw 2 and the cheek plate 9 is preferably about equal to half the diameter of the pile to be cut. This may be a matter of adjustment or for average jobs made equal to half the diameter of the average pile to be cut. During the traversing of the saw rig around the pile the cheek plates 8 and 9 are to be kept constantly in contact with the sides of the pile so as to give full depth of cut. The cheek plate 10 is so located as to clear the largest pile to be cut.

The direction of rotation of the saw 2 is shown by the arrow 16. Best results seem to be obtained when the rig is traversed around the pile in the direction shown by the arrow 17.

The extension cheek plates 9 and 10 must be of sufficient length so that when the rig is mainly supported by one straight-edge at least one of them shall reach and rest upon the other straight-edge. In case it is desired to form a tenon on top of the piles the piles may be cut off as above described at or slightly above the top of the tenons. The tenons are then marked on the piles and the straight-edges again set to saw the shoulders of the pile, taking care not to let the power saw cut into the tenons.

Various modifications in the structure of the saw or the saw attachment may obviously be made and such structures may be variously used. The methods herein described are illustrative but at the same time of specific value in such engineering practice as that indicated, the essential feature of my invention being the provision of suitable means to maintain such a saw in the same plane as it is moved around the pile or other work in making the saw cut.

In Figs. 6, 7 and 8, I illustrate several modifications of the device shown in Figs. 1, 2, and 3 for accomplishing this result. Referring to Fig. 6, the cheek plate 8 carries but a single arm 9' which is curved at its free end, as shown.

In Fig. 7, the cheek plate 8 is shown as resting on a polygonal trackway P which embraces the pile or other work. In Fig. 8 the trackway C is circular or substantially circular. These trackways need not, however, be closed figures.

In Figure 6, the under face of the arm 9' is in the same plane with the under face of the cheek plate 8. Figs. 7 and 8 show the rig with the cheek plate 8 used alone without any members in plan of plates 9 and 10.

With the circular or substantially circular trackway C, it is possible to cut on the same or substantially the same plane as the trackway itself instead of above or below the guide, predetermined a distance as the distance 14 in Fig. 2.

In all forms, the members 12, P or C constitute a plane-defining or plane-establishing guide or trackage which is parallel to the working plane of the saw so that the saw is always maintained in the same plane as it is moved around the pile or other work.

These and various other modifications in arrangement and design, according to engineering conditions controlling for the particular piece of work at hand, are all within the spirit and scope of my invention as defined by the appended claims.

What I therefore claim and desire to secure by Letters Patent is:

1. In pile leveling mechanism, in combination with a straight edge mounted on the piles to be cut, a saw mount, a saw carried thereby, a flat faced cheek plate carried by said mount and disposed parallel to the plane of and suitably spaced from said saw an angular arm carried by said cheek plate and lying in the plane thereof, said arm adapted to lie parallel to the depth axis of the saw cut whereby to guide said saw in said cut during the circumferential progress of the same about the work, the flat lower face of said cheek plate and arm bearing on said straight edge during the cutting operation.

2. In pile leveling mechanism, in combination with a straight edge mounted on the piles to be cut a saw mount, a saw carried thereby, a flat faced cheek plate carried by said mount and disposed parallel to the plane of and suitably spaced from said saw, a plurality of angular arms carried by said cheek plate and lying in the plane thereof, said arms adapted to lie parallel to the depth axis of the saw cut whereby to guide said saw in said cut during the circumferential progress of the same about the work, said cheek plate and one of said arms contacting the side of the pile during the sawing operation to guide the saw in the kerf, the flat lower face of said cheek plate and arm bearing on said straight edge during the cutting operation.

3. In pile leveling mechanism, in combination with a straight edge mounted on a pile to be cut, a saw mount, a saw carried thereby, means carried by said mount and including an angular arm adapted to lie parallel to the depth axis of the saw cut, said arm bearing on said straight edge during the cutting operation.

4. In pile leveling mechanism, a saw mount adapted to be positioned in operative relation to the pile to be cut, a saw carried by said mount and adapted to be traversed circumferentially about the work, means carried by said mount and including an angular arm adapted to lie parallel to the depth axis of the saw cut, whereby to guide the saw in the saw cut during the circumferential progress of the same about the work.

5. In pile leveling mechanism, a saw mount adapted to be positioned in operative relation to the pile to be cut, a saw carried by said saw mount and adapted to be traversed circumferentially about the work, a flat faced cheek plate carried by said mount and disposed parallel to the plane of and suitably spaced from said saw, a plurality of angular arms carried by said cheek plate and lying in the plane thereof, one of said arms adapted to lie parallel to the depth axis of the saw cut whereby to guide said saw in said cut during the circumferential progress of the same about the work.

6. In pile leveling mechanism, in combination with a straight edge mounted on the piles to be cut, a saw mount, a saw carried thereby, a flat faced cheek plate carried by said mount and disposed parallel to the plane of and suitably spaced from said saw, a plurality of angular arms carried by said cheek plate and lying in the plane thereof, said arms adapted to lie parallel to the depth axis of the saw cut whereby to guide said saw in said cut during the circumferential progress of the same about the work, said cheek plate and one of said arms contacting the side of the pile during the sawing operation to guide the saw in the kerf, the flat lower face of said cheek plate and arm bearing on said straight edge during the cutting operation.

7. In pile leveling mechanism, a saw mount, a saw carried thereby, a flat faced cheek plate carried by said mount and disposed parallel to the plane of and suitably spaced from said saw, a plurality of angular arms carried by said cheek plate and lying in the plane thereof, said arms adapted to lie parallel to the depth axis of the saw cut whereby to guide said saw in said cut during the circumferential progress of the same about the work, said cheek plate and one of said arms contacting the side of the pile during the sawing operation to guide the saw in the kerf, and means for maintaining said saw mount, said cheek plate and said angular arm in work position upon the pile to be cut.

In testimony whereof I affix my signature.

RAYMOND F. BENNETT.